Sept. 16, 1958 P. CURRY 2,852,606
ELECTRICAL COMMUNICATION SYSTEMS AND METHOD OF TRANSMITTING ENERGY
Filed Sept. 17, 1952 6 Sheets-Sheet 1

INVENTOR
Paul Curry
BY
ATTORNEYS

Sept. 16, 1958 P. CURRY 2,852,606
ELECTRICAL COMMUNICATION SYSTEMS AND METHOD OF TRANSMITTING ENERGY
Filed Sept. 17, 1952 6 Sheets-Sheet 2

INVENTOR
Paul Curry
BY
Rockwell & Bartholow
ATTORNEYS

INVENTOR
Paul Curry
BY
Rockwell & Bartholow
ATTORNEYS

INVENTOR
Paul Curry
BY
Rockwell & Bartholow
ATTORNEYS

Sept. 16, 1958 P. CURRY 2,852,606

ELECTRICAL COMMUNICATION SYSTEMS AND METHOD OF TRANSMITTING ENERGY

Filed Sept. 17, 1952 6 Sheets-Sheet 5

INVENTOR

Paul Curry

BY

Rockwell & Bartholow

ATTORNEYS

INVENTOR
Paul Curry
BY
Rockwell & Bartholow
ATTORNEYS

United States Patent Office 2,852,606
Patented Sept. 16, 1958

2,852,606

ELECTRICAL COMMUNICATION SYSTEMS AND METHOD OF TRANSMITTING ENERGY

Paul Curry, New Haven, Conn.

Application September 17, 1952, Serial No. 310,077
6 Claims. (Cl. 179—15)

This transmission may be either by radio or by wire.

It is an object of the invention to provide a method in which transmitted carrier waves may be varied within a relatively narrow band width while retaining the advantages of a relatively wide band-width of frequency variation in a receiver by multiplication of the carrier wave frequencies, and their variation, therein.

A further object of the invention is to promote economy in the allocation of frequency-band widths for communication purposes by providing a method whereby a number of independent channels of communication may be simultaneously superimposed over the same frequency band width. A phenomenon to be described clearly demonstrates how the spectrum side-current products resulting from the transmission of a number of superimposed frequency modulated carrier waves may be reduced to practical insignificance, so that the transmission of two or more carrier waves within the same band width will produce less interference than a single one of the carrier waves alone.

Still another object of the invention is to make possible the transmission and reception of intelligence under conditions substantially free from stray interference or from unauthorized interception and providing a high degree of secrecy.

U. S. Patent 2,470,760, granted to Curry May 24, 1949, discloses a method of communication wherein a transmitting station simultaneously transmits at least two carrier waves, each of them frequency modulated; at least one of the modulated carrier waves has an intelligence signal additionally superimposed, so that one of the carriers is doubly modulated. At the receiver, the doubly modulated carrier is detected under control of the singly modulated wave.

According to the present invention I provide a method of transmitting energy capable of conveying intelligence by generating a plurality of radio frequency waves of the same frequency and of different phase with respect to each other; frequency modulating a plurality of carrier waves of equal frequency and phase with these differently phased waves; and transmitting the thus modulated waves to a receiving station. In this manner a plurality of signals may be obtained over a single frequency band, phase displaced from each other.

A receiver having a heterodyning circuit may then be used to extract a desired one of the carrier waves, by phasing the heterodyning circuit in such a manner as to be in phase with a selected wave of the plurality of waves aforesaid. This phasing may be accomplished under control of one of the waves, different from the selected one. The difference between the selected one and the wave used for control may be in the frequency, or the phase, as desired and in accordance with the design of the transmission system.

In order to convey voice or music, at least one of the plurality of waves is then additionally modulated by an intelligence signal, such as may be obtained from a microphone (suitably amplified). It is a feature of the invention that a plurality of intelligence signals may be used, each one to one of the plurality of waves; as will be shown, the interference of side currents of one of these waves with respect to another is so small as to be insignificant in actual practice.

The invention further contemplates a system for electrically transmitting intelligence. Such a system includes a plurality of sources of radio frequency energy of equal frequency and phase to provide a plurality of carrier waves, all over the same band width; a plurality of sources of modulating frequency energy of equal frequency and different phase; a plurality of frequency modulating units to frequency modulate the energy derived from the plurality of sources of radio frequency energy, the frequency modulating unit being interposed between the respective sources of energy. Transmitting means, such as antennae or wire lines, connect the sources of radio frequency energy to a receiver. The receiver includes a heterodyning circuit and a phase control circuit connected to the heterodyning circuit so that the phase of the heterodyning circuit may be adjusted to a carrier which is modulated by a selected one of the phases of modulating frequency energy. Preferably the receiver includes bandpass filters and frequency multiplication circuits, so that the advantages of wide band transmission can be realized, without however sacrificing economy of bandwidth in transmission.

Since the phasing of the heterodyning circuit must be adjusted to coincide with the phase of a selected one of the plurality of the differently phased waves without drift, it is possible to achieve a great degree of secrecy in transmission, even if a receiver designed for the system is available to an unauthorized person, since not only must the correct carrier frequency be guessed at, but also the correct phase of the modulating wave must be determined; and in order to avoid drift in the receiver which differs from the slight drift which is encountered in even high grade transmitters, the local oscillator, or heterodyning circuit in the receiver must be controlled by the control wave emitted by the transmitter, which again may be of different modulating frequency from the plurality of differently phased waves. This provides in a simple and easily changed manner already three variables which may readily be introduced into the system (carrier frequency; modulating frequency phase; and control wave modulating frequency) making unauthorized interception of signals extremely unlikely and difficult.

The novel features which are considered as characteristic for the invention are set forth in particular in the appended claims. The invention itself, however, together with additional features, objects, and advantages thereof, will best be understood from the following description of specific embodiments when read in connection with the accompanying drawings, in which:

Figure 1:
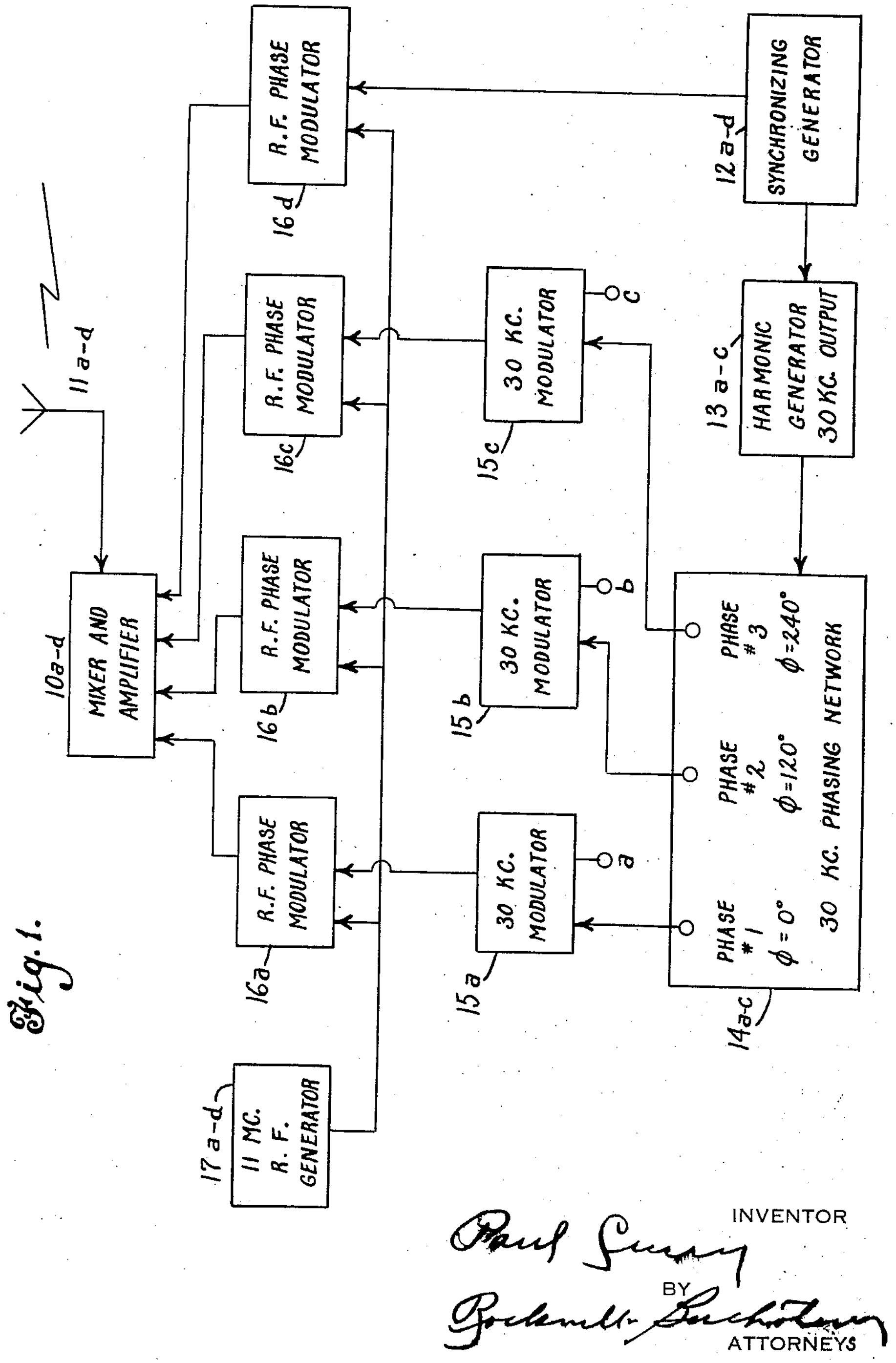
Fig. 1 is a block diagrammatic view of one form of wireless sending or transmitting apparatus.

The apparatus used in the present invention will be described first: the theoretical aspects will then be developed with particular reference to the illustrated embodiment. The numerical values stated are intended merely for purposes of illustration; other frequencies, or number of phases may be used. By way of example a system using 3 waves, shifting 120° with respect to each other, will be described. The components of the waves which are transmitted are lettered A, B, C, and D: the heterodyning wave of the receiver is lettered E; and any parts of the apparatus associated with one or more of those waves have similar suffixes *a*, *b*, *c*, *d*, and *e*, respectively.

*The transmitting system with signal frequency modulation (referring to Fig. 1)*

The heart of the apparatus is an oscillator 12*a–d*, or synchronizing generator. By way of example it may be adjusted to generate a fundamental wave of 10 kc. From this oscillator, energy is taken to a harmonic generator 13*a–c*, for example having an output of 30 kc.; any other convenient frequency, and multiplication, may be chosen, however. The output is fed into a phasing network 14*a–c* where is is divided into three components having different phase positions, and appearing at the output thereof as phases 1, 2, and 3. Phase #1 has the normal phase of the 30 kc. harmonic received from unit 13*a–c*; phase #2 is displaced 120 degrees with respect to phase #1, and phase #3 is displaced 240 degrees.

The output of phase #1 is applied to a 30 kc. modulator unit 15*a* where it is frequency modulated by signal *a*. Similarly, the output of phase #2 is applied to a 30 kc. modulator unit 15*b*, where it may be frequency modulated by another signal *b*; and the output of phase #3 is applied to a 30 kc. modulator unit 15*c*, where it may be frequency modulated by yet another signal, *c*.

A R.-F. generator 17*a–d* supplies an energy for the carrier waves, which here are designed to be 11 mc. It may be any such generator well known in the radio field. The output of this generator is frequency modulated by the output of the 30 kc. modulators, in phase modulators 16*a*, 16*b*, 16*c*, and 16*d*. The output of modulator 15*a* is used to frequency modulate the 11 mc. R.-F. energy wave in R.-F. phase modulator 16*a*, resulting in a wave A. This wave will have the characteristics of frequency modulation by the 30 kc. wave output of unit 15*a* as a basic, or primary modulation, plus the characteristics of frequency modulation imparted by signal *a* as a secondary, or signal modulation.

11 mc. R.-F. energy wave is also supplied to R.-F. phase modulator 16*b*, where it is frequency modulated by the output of modulator 15*b* resulting in wave B. This wave also will have the characteristics of 30 kc. frequency modulation, plus the characteristics of frequency modulation imparted by signal *b*.

Further, the 11 mc. R.-F. energy wave is supplied to R.-F. phase modulator 16*c*, where it is frequency modulated by the output of modulator 15*c*, resulting in wave C. This wave will have the characteristics of 30 kc. frequency modulation, plus the characteristics of frequency modulation imparted by signal *c*.

Further, the 11 mc. R.-F. energy wave is supplied to phase modulator 16*d*, where it is frequency modulated by the 10 kc. fundamental wave supplied by the synchronizing generator providing the control wave D. This wave D will only have the characteristics of frequency modulation imparted by the 10 kc. fundamental wave, the output of synchronizing generator 12*a–d*.

All four waves A, B, C, and D are then combined and amplified in mixer and amplifier unit 10*a–d*, and transmitted over an antenna 11*a–d*, or by wire, to a receiving station.

It should here be noted that the circuit elements of the unit 10*a–d* are so adjusted, in a manner well known in the art, that the four waves A, B, C, and D are combined or mixed, and amplified so as to substantially retain their respective waveforms as they appear at the several inputs of the unit 10*a–d*.

The energy radiated by the antenna is composed of a plurality of waves, each frequency modulated. One is frequency modulated by the control frequency wave of 10 kc.; the other frequency modulated waves A, B and C are frequency-modulated by signals *a*, *b* and *c*, frequency modulating their respective phase components of a 30 kc. wave. As will appear later, a comparatively narrow frequency band can carry a number of transmissions.

In this connection, it is important to note that interference between the waves A, B, and C, will be a minimum if these waves have an equal phase difference from each other and are distributed vectorially equally about 360 degrees; for example, if three phases are used, wave A will have a 0 degree phase, wave B a 120 degree phase, and wave C a 240 degree phase. If five phases are used, the phasing of the waves will be a 360÷5, or 72 degree phase angle difference between adjacent phases. It is preferred to use an odd number of phases to avoid any difficulty with waves 180 degrees out of phase with respect to each other.

It should here be noted that while the synchronizing generator 12*a–d*, as shown, applies a wave to R.-F. phase modulator 16*d*, which is subharmonically (10 kc.) related to the wave inputs of R. F. phase modulators 15*a*, 15*b* and 15*c* (30 kc.) it is not necessary for the proper operation of the system that the harmonic relationship should be on the basis of 1 to 3, as here shown. While it is preferred to describe the invention on that basis, it may be easily seen that other harmonic relationships such as 1 to 2, 1 to 5 or even 1 to 10 can be used with equal effectiveness. In fact, the system will work even on a 1 to 1 frequency relationship between the wave modulating the control wave D and the respective waves modulating the waves A, B and C. And it is contemplated that specific applications of the invention will utilize a harmonic relationship in which the wave modulating the unit 16*d* output is a harmonic of the wave components respectively modulating the outputs of units 16*a*, 16*b* and 16*c*. The units 12*a–d*, 13*a–c* and 14*a–c* of Fig. 1 can easily be adjusted, in accordance with techniques well known in the art, to deliver any combination of harmonic frequencies, as above described. But a specific example will be given in connection with a discussion of Fig. 10.

*The receiving system for signal frequency modulation (referring to Fig. 2)*

The waves A, B, and C, and the control wave D, transmitted by antenna 11*a–d* are received by receiving antenna 12*a–d*, and all the waves are applied to an amplifier unit 18.

Part of the output of amplifier 18 is applied to FM Detector 19*e* where the 10 kc. component of the wave of frequency modulation, of the wave D, is extracted. This is done by applying energy to a 10 kc. filter unit 20*e* where the 10 kc. fundamental wave is substantially separated from the other components of frequency appearing at the input of unit 19*e*.

The 10 kc. fundamental wave appearing at the output of unit 20*e* is applied to the harmonic generator 21*e* where a third harmonic of the fundamental wave is generated. The 30 kc. harmonic wave thus produced and appearing at the output of unit 21*e* is applied to a phasing control 22*e*.

The phasing control is an adjustable unit designed so that the phase of the 30 kc. wave may be shifted, so as to coincide in phase with the wave of frequency modulation of the selected one of the transmitter carrier waves A, B or C. In the present example, it may be assumed that the carrier wave A has been selected, so that the 30 kc. wave at the output of unit 22*e* is adjusted to be in exact synchronism with the wave of frequency modulation of the carrier wave A.

The output of unit 22*e* is applied to the input of a phase modulator 23*e*.

An R.-F. generator 24*e* is adjusted to have an output of 10.7 mc.; the fundamental wave of this frequency is applied to the other input of the phase modulator 23*e*. The wave appearing at its output then will contain the characteristics of frequency modulation imparted by the 30 kc. wave of unit 22*e* to the 10.7 mc. wave output of unit 24*e*. This wave, generated in the receiver, is here denominated the local wave, E.

Returning now to the input circuit of the receiver, it will appear that part of the output of the first amplifier 18 is applied to the input of a mixer 25. This mixer has applied to it the local wave E, from unit 23*e*, as well. The difference between the frequency of the transmitted carrier wave (11 mc.) and that of the local wave (10.7 mc.), will be the center frequency of a wave appearing at the output of the mixer (300 kc). In order to obtain the advantages of wide band reception, the output of unit 25 is multiplied in a frequency multiplier 26. There the center frequency F (300 kc.) and the deviation ratios represented by the frequency modulation wave pattern are multiplied by a substantial factor, e. g. 216 $(2\times2\times2\times3\times3\times3)$. At the output of unit 26, the wave patterns of frequency modulation are centered on a new frequency $F=64.8$ mc. $(216\times300)$; the deviation ratios of the components of frequency modulation represented by the waves A, B, C and D, as multiplied, are also correspondingly greater than at the input of frequency multiplier 26.

One of the outputs of the 10.7 mc. R.-F. generator is applied to a harmonic generating unit 28 where the 5th harmonic of the 10.7 mc. fundamental wave is produced (53.5 mc.). This wave of 53.5 mc. is mixed in a second mixer 27 with the output of frequency multiplier 26.

The output of unit 27 will be centered on a frequency $F=11.3$ mc. (the difference between the frequencies 64.8 and 53.5 mc.). The wave E and the wave A (by the adjustment of phasing control 22*e* here assumed) are in synchronism. Therefore the frequency difference between the waves A and E at any instant of time will always be constant, subject only to a small frequency deviation representative of the signal *a* which was applied as secondary frequency modulation at the transmitting station. The frequency difference between waves E and B and C however will not be constant due to the phase difference. It is therefore possible to select the wave A by passing the output of unit 27 through a bandpass filter which is so adjusted as to have a bandpass just wide enough to pass signal *a*, here 10 kc., centered on 11.3 mc.

At the output of unit 29 there will then appear the center frequency F (11.3 mc.) consisting principally of the center current of a wave here (and in Fig. 6, as will later appear) denominated A′, and a pair of side frequency products of frequency modulation $F\pm fa$, where *fa* represents the frequency of the signal *a* applied to the carrier wave A at the transmitting station.

Side frequency products of the original control wave D are also present, as well as side frequency products of the original waves B and C. As has been stated, by making the band pass small enough, these frequency products may be so attenuated as to become insignificant.

The output of unit 29, containing the signal modulated wave A′ is applied to the FM discriminator 30, where the wave component of the signal *a* is extracted; the output of the discriminator may then be applied to an audio amplifier and then to a translator such as a loud speaker, as is well known in the art. At the loudspeaker, the signal *a* will appear as a substantially true reproduction of the signal *a* when applied as modulation of the carrier wave A, within the bandpass limitations imposed in transmission.

*Signal transmission and reception as amplitude modulation (referring to Figs. 3 and 4)*

Figure 3:
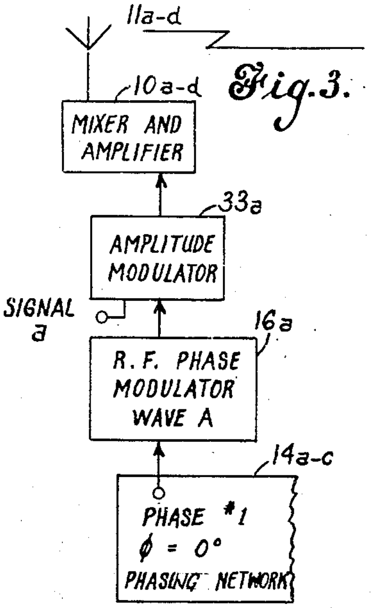
Fig. 3 is another block diagrammatic view of the transmitting apparatus showing the change necessary to effect transmission by amplitude modulation, rather than frequency modulation.

Figure 3 indicates the change necessary in the transmitter apparatus when it is desired to use signal amplitude modulation. In Fig. 1 the signal *a* is applied as frequency modulation to the modulator 15*a*; as shown, in Fig. 3, with amplitude modulation, the modulator 15*a* becomes unnecessary, and the 30 kc. signal may be fed from the phasing network 14*a–c* directly to the R.-F. phase modulator 16*a*, in order to frequency modulate the 11 mc. carrier wave. The signal *a* is then applied to a signal input of a unit 33*a*, an amplitude modulator, which is interposed between the R.-F. phase modulator 16*a* and the mixer and output amplifiers 10*a–d*. As before explained, when the four waves A, B, C, and D are combined or mixed and amplified, the circuit elements are so adjusted that they retain their respective wave-forms as they individually appear at the several inputs of the unit 10*a–d*. The signal applied to the unit 33*a* amplitude modulates the frequency modulated output of unit 16*a*. Likewise, signals *b* and *c* similarly amplitude modulate the already frequency modulated 11 mc. R.-F. energy.

Figure 4:
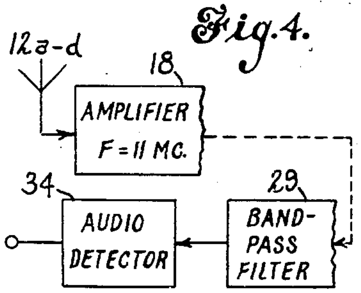
Fig. 4 is a block diagram showing the change necessary in the receiver to receive the wave sent by the apparatus of Fig. 3.

Fig. 4 indicates the changes necessary in the receiving system. In the FM signal modulation system, the FM discriminator 30 detects the signal frequency modulation at the output of the bandpass filter 29. In the amplitude-modulation arrangement, an audio detector 34 is substituted for the discriminator 30.

*Theoretical aspects*

For simplicity of description, it will first be assumed that the waves A, B and C are not modulated by any signal *a, b*, or *c*, respectively.

Figures 5, 6:
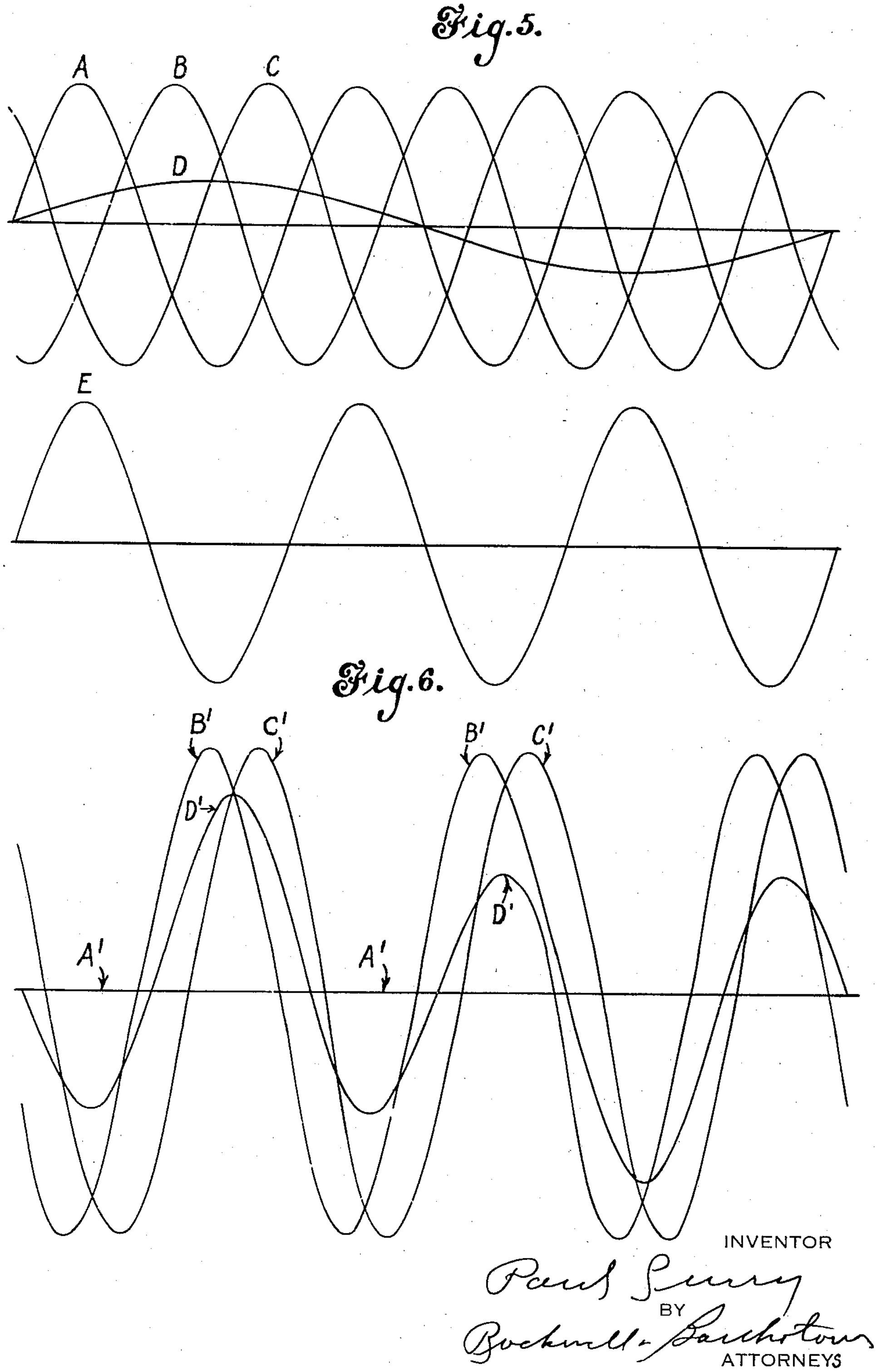
Fig. 5 is a schematic representation of five waves before the process of synchronization at the receiver.
Fig. 6 is a similar view of four resultant waves after the process of synchronization.

Figure 5 shows the frequency variation of the waves A, B, C and D. It will be seen that they are all centered about a common center frequency of 11 mc., and have sinusoidally varying curves of frequency variation. The rate of frequency variation of waves A, B and C is 30 kc. (by setting of the unit 13*a–c*). As will appear later, the value of $\beta$ ($\Delta F/f$, where F is the center frequency; $\Delta$F is the frequency excursion, and $f$ is the rate of frequency variation) should be small, e. g. 0.25. For such a value of $\beta$, the maximum frequency excursion will be 7.5 kc.

The fourth sinusoidally frequency modulated wave appearing on Fig. 5 is wave D; it operates as the control wave in conjunction with reception of the carrier waves A, B, and C. The center frequency of this control wave, F, is identical with that of the three carrier waves, 11 mc. Its rate of frequency modulation is $f=10$ kc. (by setting of unit 12*a–d*). For a value of $\beta$ $(\Delta F/f)=0.25$, the maximum frequency excursion will be 2.5 kc. This is indicated on Fig. 5.

The fifth frequency modulated wave appearing on Fig. 5 is wave E, the local wave of the receiver. The center frequency of wave E is 10.7 mc. (by setting of the oscillator 24*e*). Its maximum frequency excursion, $\Delta$F, and rate of frequency modulation $f$, are the same as those for the transmitted carrier waves A, B and C.

As has been shown in connection with the description of the apparatus, above, a component of the third harmonic of the 10 kc. fundamental wave is used, in its normal phase of its generated characteristics, to produce the frequency modulation characteristics of carrier wave A. A second component of this 30 kc. harmonic is phase displaced with respect to the phase of the first harmonic so as to have a −120 degree difference, producing the frequency modulation characteristics of carrier wave B. A third component of this 30 kc. harmonic is phase displaced with respect to the phase of the first harmonic so as to have a −240 degree difference, producing the frequency modulation characteristics of carrier wave C. The frequency modulation characteristics of the carrier waves A, B and C and of the control wave D are imposed on four separate components of a single 11 mc. fundamental wave. The center currents of all four waves will therefore exactly coincide in frequency.

At the receiving station, the carrier waves A, B and C and the control wave D are received and the fundamental component of the wave of frequency modulation of the control wave D is detected. This component is then caused to generate its third harmonic of 30 kc. The phase of this new 30 kc. wave is varied so as to become phase-synchronous with the wave of frequency modulation representing the modulation characteristics of a selected one of the three carrier waves A, B and C.

For purposes of this discussion, it will be assumed that it is desired to select wave A. The phase of wave E will therefore be adjusted to be in phase with wave A, and Fig. 5 shows this relation.

Fig. 6 shows the frequency difference components resulting from heterodyning wave E (with a center frequency of 10.7 mc.) with the carrier waves A, B and C and the control wave D.

The component of frequency difference at any instant of time between the carrier wave A, and the local wave E is constant, and shown as the fixed frequency A′. The frequency differences between the wave E and the waves B, C and D are represented as the frequency modulated waves B′, C′, and D′. The frequency difference components of Fig. 6 together form a complex wave. This resultant complex wave is then frequency multiplied so that the values of the center frequency, F, and of the frequency excursion, ΔF as well, are substantially increased. The bandpass of the network connected with the process of frequency multiplication is designed to permit the passage of all significant side current products of frequency modulation. The resultant, substantially frequency multiplied, is then applied to a resonant network having a bandpass only 10 kc. wide, centered on the now multiplied center frequency F, which is the center current of the waves A′, B′, C′, and D′, so that frequencies more than ±5 kc. away from the center current are highly attenuated. Therefore, only those side currents with frequencies within the bandpass limit of ±5 kc. will be allowed to pass, while all others will be reduced to practical insignificance. As will more clearly appear later, the wave A′ of Fig. 6 will be substantially received, while the waves B′, C′, and D′ will be substantially rejected.

When the carrier waves A, B and C are additionally modulated by intelligence signals, these signals should only have components of frequency no higher than 5 kc. This secondary, or intelligence signal modulation, may be either amplitude modulation, or additional frequency modulation imposed on the 30 kc. rate of frequency modulation of each of the carrier waves as has been shown. If the signal is applied as additional frequency modulation, it will be applied to add such a small value of ΔF to the basic frequency modulation of the carrier wave that, after the frequency multiplication process described above, the spectrum distribution for the signal frequency modulation will cover a bandwidth no greater than 10 kc., centered on the center current of the selected wave at the receiving station, shown as the fixed frequency A′ in Fig. 6.

As has been stated, for the purpose of the present theoretical discussion, it may be assumed that the carrier waves A, B and C of Fig. 5 contain no intelligence signal modulation, in the form of additional AM or FM modulation. The effect of such signal modulation will be discussed later. As shown on Fig. 5, both the carrier waves B and C have equal phase displacements with respect to that of the carrier wave A; they will therefore produce equal values of ΔF for the waves B′ and C′ of Fig. 6 (which are the frequency differences between the wave E and the waves B and C). This value of ΔF for the waves B′ and C′ (the phase displacement being 120 degrees as shown) will then be $$7.5 \text{ kc.} \times \sqrt{(1.00+.5)^2+.866^2}$$

or 7.5×1.732, or 12.99 kc.

The wave D′, however, is a complex curve of frequency modulation containing a component of the 30 kc. rate of the wave E plus the component of the 10 kc. rate of the control wave D. Its maximum value of ΔF is therefore the sum of the frequency excursion value of the wave E (7.5 kc.) plus that of the control wave D (2.5 kc.), which equals 10 kc.

Under the circumstances described, the modulation index $\beta$, for each of the waves B′ and C′ is, $$\beta=\Delta F/f=12.99/30=0.433.$$

The phase excursions of the waves B′ and C′ each will be $\Delta\theta$=24.81 degrees (.433×57.3°); (1 radian=57.3 degrees). The component of the 30 kc. rate of frequency modulation of the wave E in the complex wave D′, with its frequency excursion value of 7.5 kc. represents a modulation index of $\beta$=.25 (7.5/30). This is also the modulation index for the component of the 10 kc. rate of frequency modulation of the wave D (2.5/10) as has been shown. The equivalent values of $\Delta\theta$ for each of these two components is therefore ¼ radian, or 14.325 degrees.

Frequency multiplication of the components represented in Fig. 6 does not change the pattern of frequency variation. For example, multiplication by a factor of 216 (3×3×3×2×2×2) may be made; the pattern of frequency variation will still be based on the common center frequency of the waves B′, C′, and D′, which is the constant frequency of the wave A′. The frequency difference between the carrier wave A and the local wave is 300 kc., (11.0 mc.−10.7 mc.) as has been shown, and this is the center frequency F, of the waves A′, B′, C′, and D′ before frequency multiplication. After multiplication, the center frequency F becomes 64.8 mc. (216×0.3 mc.).

As a result of the frequency multiplication, the waves B′ and C′ increase their value of $\beta$ to 93.528 (216×.433), while each of the 10 kc. and the 30 kc. components of the wave D′ increases its value of $\beta$ to 54.0 (216×0.25).

The circuit parameters involved in the frequency multiplication must be so designed to permit propagation of all significant side-current products of frequency modulation; the means by which this may be accomplished involve well known techniques. For example, the waves B′ and C′, with $\beta$=93.528 require the widest bandwidth which, under the circumstances must equal approximately 210×$f$, or 6.3 mc. (210×30 kc.), centered on the frequency $F$=64.8 mc. after frequency multiplication. And this bandwidth also accommodates the products of the frequency multiplied wave D′ since $\beta$ is less for wave D′, for both the 30 and 10 kc. component.

The wave A′ possesses a constant frequency, F, and the frequency modulated waves B′, C′, and D′, with their respective wide-band complements of side frequency products, are now applied to a resonant network having a bandpass width of only 10 kc., centered on frequency F. The frequency F, representing all the energy of waves A′, as well as the center current energies of waves B′, C′, and D′, is propagated through the resonant network with minimum attenuation. However, frequencies with a bandwidth in excess of ±5 kc. undergo maximum attenuation, so that the side frequency products of the three frequency modulated waves appear with their amplitude reduced to practical insignificance. The wave A' contributes its total amplitude, 1.00 I$m$, to the center frequency F.

The contribution of each of the waves B' and C' to the center frequency amplitude may be determined by use of tables of Bessel functions. It may be found that the value of $J_0$ (93.528) is .00433 I$m$; for both waves, the total contribution will therefore be 2×.00433=.00866 I$m$. Before determining the contribution of the wave D' to the center frequency amplitude, the spectrum distribution of wave D' must be found. Its spectrum distribution is derived by the frequency modulation of each of the side current products corresponding with the modulation index representing one component of frequency modulation, with the degree of frequency modulation represented by the modulation index of the other component of frequency modulation (here, the modulation index is the same in both cases). For the present case, where a fundamental component of 10 kc. is frequency modulated by a third harmonic component of 30 kc., each of the multiples for the complex wave D' contains products generated by the frequency modulation of fundamental components $\pm 3f$ and multiples of $\pm 3f$ away, where $f$=10 kc. The equation for the center current of frequency F, is:

$$J_0(\beta)=Im\cos\Omega t\{J_0(\beta_1)J_0(\beta_2)+2[J_3(\beta_1)J_1(\beta_2)]+2[J_6(\beta_1)J_2(\beta_2)]+\ldots\}$$

where $\beta_1$ represents the modulation index of the fundamental (10 kc.) wave, and $\beta_2$ represents the modulation index of the third harmonic (30 kc.) wave (here equal). From tables of Bessel functions, after substituting values, $J_0$=.05766 I$m$.

For the first side current pair, of frequency $F\pm f$, the amplitude is determined by:

$$J_1(\beta)=Im\sin(\Omega\pm\omega)t\{J_1(\beta_1)J_0(\beta_2)+J_4(\beta_1)J_1(\beta_2)+J_7(\beta_1)J_2(\beta_2)+\ldots J_2(\beta_1)J_1(\beta_2)+J_5(\beta_1)J_2(\beta_2)+J_8(\beta_1)J_3(\beta_2)+\ldots\}$$

substituting values, $J_1$=.03517 I$m$.

The amplitude for the second side current pair, of frequency $F\pm 2f$, is derived by the equation:

$$J_2(\beta)=Im\cos(\Omega\pm 2\omega)t\{J_1(\beta_1)J_1(\beta_2)+J_4(\beta_1)J_2(\beta_2)+J_7(\beta_1)J_3(\beta_2)+\ldots J_2(\beta_1)J_0(\beta_2)+J_5(\beta_1)J_1(\beta_2)+J_8(\beta_1)J_2(\beta_2)+\ldots\}$$

substituting values, $J_2$=.09533 I$m$.

The total amplitude of the center current of frequency F is then the sum of the amplitude of wave A' (1.00 Im) plus the sum of the center current contributions of the waves B' and C' (.00866 I$m$) plus the center current amplitude of wave D' (with frequency F), equal to .05766 I$m$. The resultant center current amplitude is therefore:

(1.00+.00866+.05766)I$m$, or 1.06632 I$m$

In determining the proportion of the side current energies appearing within the bandpass of the resonant network, it may be assumed (by design of the bandpass filter) that frequencies ±20 kc. away are attenuated to .02 and frequencies ±30 kc. away are attenuated to .01 of their applied amplitude.

When the first side current pair of the wave D', at $F\pm f$ i. e. 10 kc. is applied to the bandpass filter, it will have an amplitude of .03517 I$m$ (Equation 2 above). It will be attenuated by the filter to .00211 I$m$ (.03517×.06)

The amplitudes of .09533 I$m$ of the second side current pair of wave D', at $F\pm 2f$, i. e. $F$±20 kc. become attenuated to .00095 I$m$ (.9533×.02).

The first side current pairs of the waves B' and C' at $F$±30 kc., for $J_1$ (93.528) have amplitudes of —.07225 I$m$; these are attenuated to .00072 I$m$ (.07225×.01) in the resonant network.

Since values below .001 I$m$ are below the level determining significance, the side current contributions to the resonant network by the waves B' and C' may be totally disregarded, and this applies to the third side current ($F$±30 kc.) contributions of the wave $D_I$ as well. The sum of the currents in the resonant network therefore consists of the center current, with an amplitude of 1.06632 I$m$, and the first side frequency pair of wave D', with an amplitude of .00211 I$m$. The second side frequency pair of the wave D', with amplitudes of .00095 I$m$ may also be disregarded as insignificant.

The wave A', in this example selected as the wanted wave, contributes its total amplitude 1.00 I$m$ to the resonant network. This represents an amplitude over 230 times greater than the amplitude contributed by the unwanted waves B' and C' (.00433 I$m$). This proportion is maintained even when the transmitted carrier waves A, B and C, are each modulated by unrelated independent signals.

*Effect of signal modulation.—(a)—Amplitude modulation*

As has been shown, only the center current product of frequency modulation on any of the transmitted signal carrier waves appears in the resonant network; the products of supplemental amplitude modulation appearing within the resonant network are those side currents directly related with the center currents of the waves A', B', and C'. Thus, for 100% modulation, the center current of the wave A', with a value of 1.00 I$m$, produces two side current products of amplitude modulation with values of .5 I$m$. For a maximum signal frequency of 5 kc., these side currents have frequencies of $F$±5 kc. Under the same conditions, each of the center currents of the unwanted waves B' and C' produce side current products of amplitude modulation with values of .00216 I$m$ (.5×.00433).

It may be noted that with maximum signal modulation on all three signal waves the ratio of the wanted signal side current amplitude to the amplitude of any of the unwanted signal side currents is the same as with the respective center currents (over 230:1).

*(b) Frequency modulation*

As has been explained, the intelligence signal modulation may be applied as secondary frequency modulation on the basically frequency modulated carrier waves A, B and C. In this case, the intelligence signal modulation is applied in such a manner as to add only a very small value of additional frequency excursion, ΔF, to the amount of frequency excursion due to the basic, 30 kc. frequency modulation. After the frequency multiplication process at the receiving station, the components of intelligence signal frequency modulation on the waves A', B', and C' (represented in Fig. 6) will add no more than a single pair of signal side currents to each of the products of the basic frequency modulation of 30 kc. This will be the case when the modulation index has a value of less than .400. The center current multiplier $J_0$ (.4)—from tables of Bessel functions—has a value of .9604 I$m$; the multiplier $J_1$ (.4) has a value of .1906 I$m$; the multiplier $J_2$ will be insignificant.

When the modulation index of the doubly frequency modulated wave is $\beta$=.4, the center current of wave A' is reduced to .9604 I$m$, and the pair of signal side current products have a value of .1906 I$m$.

The effect of the intelligence signal modulation on the waves B' and C' will be to reduce the center current which contributes to the center frequency amplitude, over such contribution by the singly modulated wave. The contribution with intelligence signal frequency modulation will be .00415 I$m$ for each of the waves B' and C', plus a pair of signal side currents having a value of .00082 I$m$ for each wave. The ratio of wanted intelligence signal side current to the unwanted signal side currents will be substantially the same however—over 230 to 1.

*Effect of a small value of modulation index $\beta$ ($\Delta F/f$)*

Figure 7:
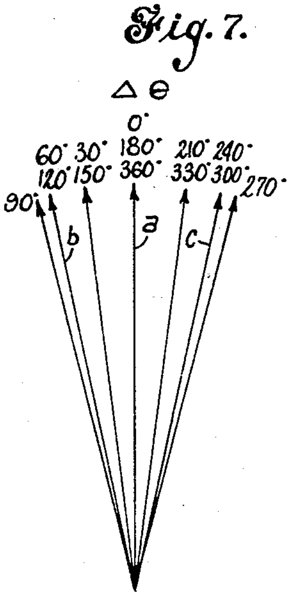
Fig. 7 is a vector representation of the process of frequency modulation.

Fig. 7 shows the position of the frequency modulated carrier current vector $I_t$ at 30 degrees intervals, through one complete cycle represented by the expression $\beta \sin \omega t$, in the common form of the equation for frequency modulation.

$$I_t = Im \sin [\Omega_t + \beta \sin \omega_t]$$

where $\beta$ stands for $\Delta F/f$ for pure frequency modulation; $I_t$ is the instantaneous current; Im is the center current; F the center frequency; $\Delta$F the frequency excursion; $f$ the rate of frequency modulation, $\Omega$ the angular velocity of the carrier, and $\omega$ the angular velocity of the frequency modulation component.

Figure 8:
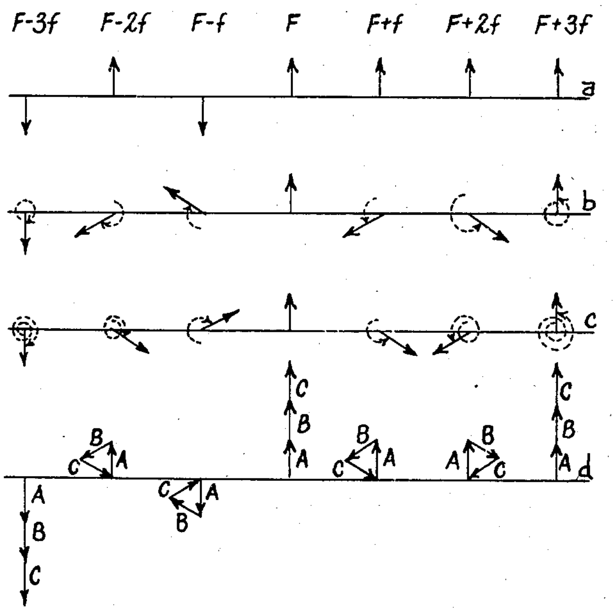
Fig. 8 is a vector representation of the frequency distribution resulting from frequency modulation.

For a small value of $\beta$=.25 for example, the maximum phase excursion $\Delta\theta$ will be ¼ radian, or 14.325 degrees and Fig. 8$a$ shows the center frequency and important side frequency products vectorially at the instant when $\beta \sin \omega t = 0$ degrees. The Bessel coefficients involved in the spectrum distribution are not taken into acount here, in order to more clearly illustrate the concept according to which a number of frequency modulated waves may cooperate to eliminate the side current evidences of their existence. As a result, the vectors are shown with equal lengths, and represent their relative phase positions at the instant represented by the vector $a$ in Fig. 7.

Fig. 8$b$ shows the same vectors of Fig. 8$a$ rotated to their respective positions represented by $\omega t = 120°$, corresponding with the position $b$ of the carrier wave vector of Fig. 7. Since the center current of frequency F has an angular velocity $Im \sin \omega t$, equal to that of the unmodulated carrier wave, corresponding in phase to the position of $a = 0°$ in Fig. 7, its phase positions at the instant represented in Figs. 8$b$ and 8$c$ do not vary from that shown in Fig. 8$a$. Fig. 8$b$ represents a second carrier wave, with center frequency F, maximum frequency excursion $\Delta$F and rate of frequency modulation $f$, identical with those of the first carrier wave. But the current vector $I_t$ of the second wave has a phase position of +120 degrees with respect to that of the first wave, corresponding with the position $b$, in Fig. 7, for $\omega t = 120$ degrees, as stated. As shown, the $F \pm nf$ vectors will each have rotated to its new position $(\Omega \pm n\omega)t$ which for $F \pm f$ is $\Omega \pm 120$ degrees, for $F \pm 2f$ is $\Omega \pm 240$ degrees, and for $F \pm 3f$ is $\Omega \pm 360$ degrees.

Fig. 8$c$ represents a third carrier wave with values of F, $\Delta$F, and $f$ identical with those of the first and second waves. But the vector $I_t$ of the third wave has a phase position of +240 degrees with respect to that of the first wave, corresponding with the position $c$, in Fig. 7, for $\omega t = 240$ degrees. As shown, the $F \pm nf$ vectors will each have rotated to its position $(\Omega \pm n\omega)t$, which for $F \pm f$ is $\Omega \pm 240$ degrees, for $F \pm 2f$ is $\Omega \pm 480$ degrees and for $F \pm 3f$ is $\Omega \pm 720$ degrees.

Assuming the first, second and third carrier waves to be transmitted, each with characteristics as shown, and with identical carrier levels I$m$, then the spectrum distribution will contain the resultant vector display shown in Fig. 8$d$.

As shown, the current of the resultant frequency F has three times the amplitude of that of one carrier alone. Similarly, the currents of the resultant frequencies $F+3f$, and $F-3f$, each possess three times the amplitudes of the corresponding frequencies of one carrier wave alone. But the currents of the resultant frequencies $F \pm f$, and $F \pm 2f$ will cancel each other out.

The resultant spectrum distribution will therefore consist of the center current of frequency F, and the side current pair of frequency $F \pm 3f$.

It will now be shown that the resultant side frequency pair $F \pm 3f$ is insignificant for a small value of $\beta$, e. g. for $\beta$=.25, so that the resultant spectrum distribution will consist of a single significant current of frequency F.

From tables of Bessel factors, the value of $J_0$ ($\beta$=.25) for the amplitude of carrier frequency F is .98431 Im; that of $J_1$ (.25) for the amplitude of frequencies $F \pm f$ is .12451 I$m$, that of $J_2$ (.25) for frequencies $F \pm 2f$ is .00783 I$m$, and that of $J_3$ (.25) for frequencies $F \pm 3f$ is .00032 I$m$.

As has been shown, the frequencies $F \pm f$, and $F \pm 2f$ cancel each other. The amplitude of each of the side frequency pair of $F \pm 3f$ is $3 \times J_3$ (.25), or $3 \times .00032 = .00096$ I$m$. Accepting the lower limit determining significant amplitudes as .001 I$m$, then it is seen that the amplitude of the side frequency pair of $F \pm 3f$ is insignificant. The spectrum distribution, as shown in Fig. 8$d$ will therefore consist of one significant current only, of frequency F, which is equal to $3J_0$ (.25), or $3 \times .98431 = 2.95293$ I$m$.

If the value of $\beta$ in the above example is reduced, the value of $J_3$ ($\beta$) is also reduced, thus decreasing the amplitudes of the frequency pair $F \pm 3f$ to further insignificance.

Figure 9:
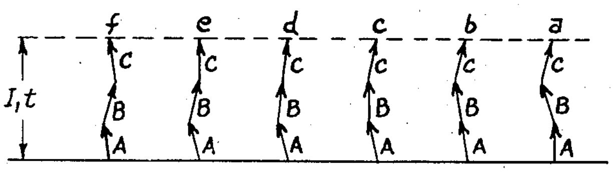
Fig. 9 shows three superimposed vectors having different phase positions, at a number of instants during the process of frequency modulation.

Since the resultant amplitude 2.95293 I$m$ for the current of frequency F, is the only significant energy appearing in the spectrum equation for the summations represented in Fig. 8$d$, this value must also be representative of the carrier level I$m$. The summation of the instantaneous carrier vectors must, at any instant, produce a resultant having a constant amplitude I$m$, at the frequency F. This is shown in Fig. 9 where, from $a$ to $l$, the three waves, represented as A, B and C, are superimposed to produce a resultant instantaneous vector $I_{1t}$ of constant amplitude and phase, regardless of phase variations of its component vectors. The successive intervals from $a$ to $l$ correspond with the 30 degree intervals represented for the complete cycle of Fig. 1. The phase positions of Fig. 1, however, correspond with those of the wave A of Fig. 9. These same waves are also vectorially represented in Fig. 5 as sinusoidal waves of frequency variation. As observed above, they have a common center frequency F, an equal frequency excursion $\Delta$F, and the same rate of frequency modulation $f$.

As has been shown above, the side currents become insignificant when the phases are spaced equally around a full cycle of 360 degrees. As noted above, it is preferred to use an odd number of phases to avoid any difficulty with phases which might be exactly opposed to each other, thereby avoiding any interference problems which might be encountered with the intelligence signals itself.

Wave D is not absolutely necessary; any one of the waves A, B or C may be used as a reference for the phasing of another desired wave by adjustment of filters; and any one of the waves may contain an intelligence signal, which can be removed therefrom by a limiter circuit from one of the phases, as is well known in the art, if such one phase is to be used as the control wave. However, it has been found in actual practice that the receiver is stabler and easier to adjust if a separate control wave is used, which has a different modulating frequency from that of the differently phased waves.

If wave D is present, and the waves which have the intelligence signals impressed thereon are phase shifted from this wave D (e. g. wave A is shifted 30 degrees; and B and C are then shifted 150 and 270 degrees, respectively, with respect to wave D), secrecy of transmission is enhanced since an unauthorized interceptor would have to duplicate the phase shift of wave D with respect to the waves containing the intelligence signals, as well as the frequency of modulation of these waves and of wave D.

It is preferred to have a single generator of energy 12$a$–$d$ to supply the basic frequency for modulating all waves A, B, C and D; and likewise, it is preferred to have one 11 mc. R.-F. generator 17$a$–$d$ to supply the basic frequency of the carrier wave; however separate generators of the basic frequencies may be used, if care is taken to prevent drift of phase, and frequency, of one with respect to the other.

The system, and the method described, also lend themselves to carrier suppressed sideband transmission. Since such transmission is well known in the art, no detailed decription is deemed necessary. Reference regarding circuit details may be had generally in The Radio Amateur's Handbook, published annually by the American Radio Relay League, West Hartford, Connecticut (1950 and subsequent editions), and detailed literature there cited.

Figure 10:
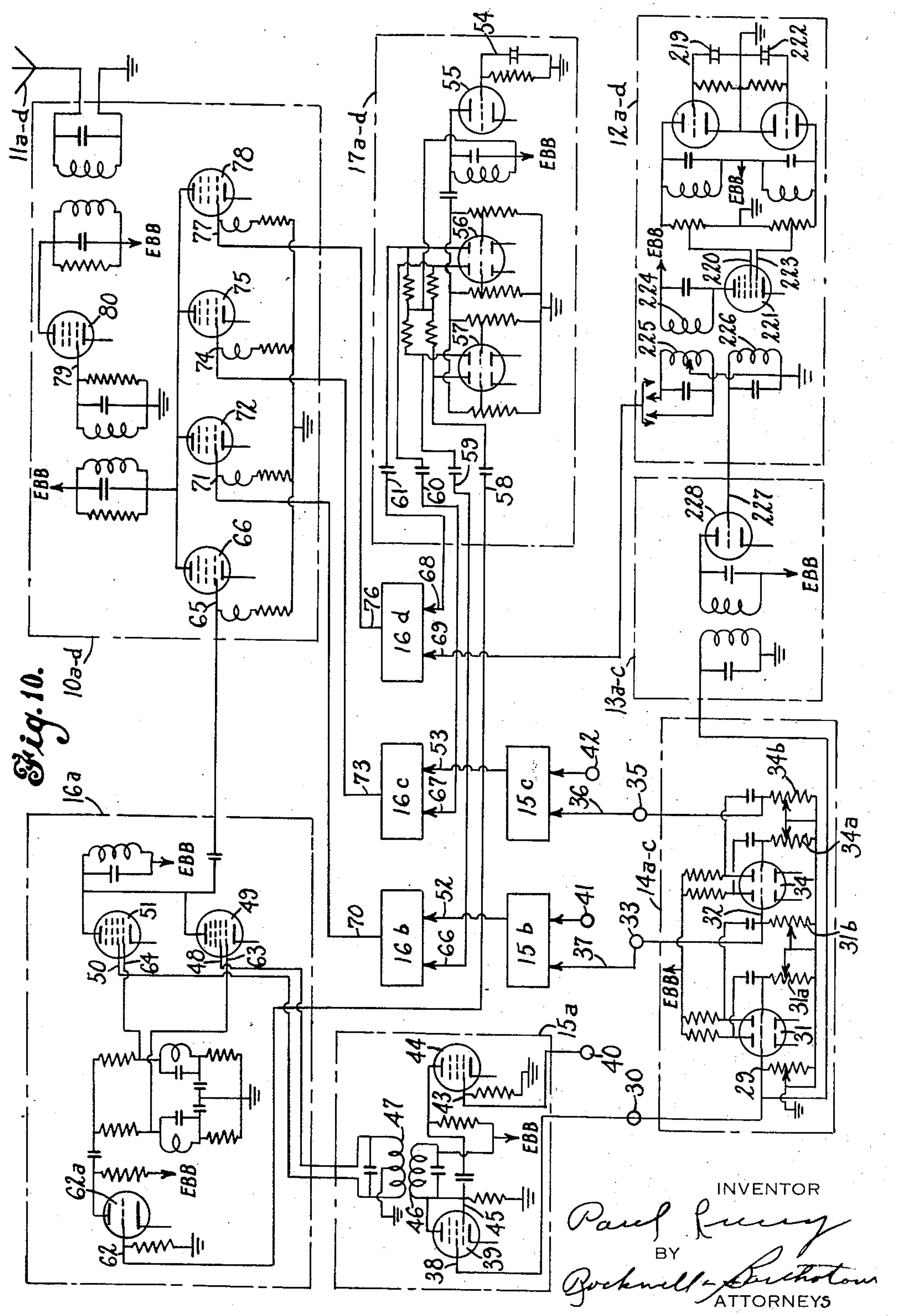
Fig. 10 is a schematic wiring diagram of a transmitting apparatus of Fig. 1.

*Actual circuits.—Transmitter* (*referring to Fig. 10*)

Reference will now be made to Fig. 10 where an illustrative example of an actual circuit of a transmitter according to the invention is shown. Component units whose functions have previously been explained are enclosed in dot-dashed lines and identified with the above used reference numbers.

Unit 12*a–d*, the synchronizing generator consists of a crystal oscillator, having crystals 219 and 222, and connected to a mixer tube 221 through connections 220 and 223. Such an oscillator is generally well known in the art; the output of this mixer tube is taken off the primary of transformer 224, which is part of a tuned circuit, tuned to 10 kc. The transformer has two secondaries, also tuned to 10 kc. One secondary 226 is connected to the input 227 of a harmonic generator tube 228 of unit 13*a–c* where the frequency of the energy received from the synchronizing generator is multiplied. The output of the harmonic generator is fed to phasing network 14*a–c*, which consists of a first phasing tube 31, having its input 29 connected to the output of unit 13*a–c*. If it is desired to have wave A in phase with wave D, the output of unit 13*a–c* is directly taken to terminal 30 of unit 14*a–c*. To obtain energy phase displaced from phase A, the phasing network, is employed; such circuits are well known in the art. Here, by adjustment of resistors 31*a* and 31*b*, the transconductance of tube 31 is varied, thereby varying the phase of the signal passing therethrough; likewise, a second phasing tube 34, whose transconductance can be varied by adjusting resistors 34*a* and 34*b* is used, having input 32. The output of these tubes 31 and 34 is taken off at terminals 33 and 35. If more than three phases are desired, similar phasing networks must be provided for additional phases.

The 30 kc. frequency energy appearing at terminal 30 is applied at input 38 to a modulator tube 39. An intelligence signal such as that received from a microphone and applied to terminal 40, is conducted to input 43 of the signal amplifier tube 44, from where the amplified signal is fed to second input 45 of modulator tube 39, as is well known in the art. The output of tube 39, which will be a 30 kc. wave frequency modulated by signal *a*, is taken through tuned transformer (tuned to 30 kc.) 46, 47 to R.-F. phase modulator 16*a*.

Units 15*b* and 15*c* are constructed similar to unit 15*a*, signal *b* being applied at 41, and signal *c* at 42. 30 kc. frequency energy from terminals 33 and 35 is conducted to units 15*b* and 15*c* by means of leads 37 and 36.

R.-F. generator 17*a–d* consists of a crystal controlled oscillator having crystal 54, and oscillator tube 55. Twin triode tubes 56, 57 act as buffer tubes and amplifiers, and deliver energy at 11 mc. frequency through blocking condensers 58, 59, 60 and 61 to R.-F. modulators 16*a*, 16*b*, 16*c*, and 16*d* at respective first inputs 62, 66, 67 and 68; modulating frequency energy is conducted to these units through respective second inputs 48, 50; 52; 53 and 69. These units are all similar, unit 16*a* only being shown in detail. 11 mc. frequency energy is amplified in triode tube 62*a* and frequency modulated by the 30 kc. frequency energy applied to tubes 49, 51 by a reactance modulator circuit as is well known in the art. The output of unit 16*a* will be wave A which is a composite of 11 mc. radio energy, frequency modulated by the output of unit 15*a* (which in turn is a composite of 30 kc. energy, frequency modulated by the signal *a*).

Wave A, together with waves B, C and D, obtained from outputs 70, 73 and 76 is applied to mixer and amplifier 10*a–d*, which consists of tubes 66, 72, 75 and 78, having inputs 65, 71, 74 and 77 connected to the aforementioned outputs. The outputs of these tubes 66, 72, 75 and 78 may be combined in a common plate circuit, as shown, applied to a final R.-F. power amplifier tube 80 having input 79, and then transmitted over antenna 11*a–d* to a receiving station.

As before mentioned, the four waves A, B, C and D appear, amplified, at the output of unit 10*a–d* with substantially the same wave-form they possess at their respective inputs. Also as before noted, it is not essential to the proper operation of the invention that the wave output of unit 12*a–d* which is applied to unit 16*d* be 10 kc. while the wave components applied to the units 15*a*, 15*b* and 15*c* be 30 kc. For it can easily be seen that by proper adjustment of crystals 219 and 222 of unit 12*a–d* a different frequency than 10 kc. may be secured. Also transformer primary 224 and the two secondaries 225 and 226 may be so adjusted as to both be resonant to the same frequency, in which case the output of unit 16*d* will be frequency modulated at the same rate as the outputs of units 16*a*, 16*b* and 16*c*.

Alternatively, the transformer output of tube 221 may be so adjusted as to deliver a 30 kc. harmonic wave, for example, from transformer secondary 225, while delivering a fundamental 10 kc. wave from secondary 226. In this case, by proper adjustment of the circuit elements of unit 13*a–c*, tube 228 may be changed in its operation from a harmonic generator to a 10 kc. simple amplifier. The foregoing changes and those associated with the proper phasing of a 10 kc. wave represent techniques easily envisioned by those skilled in the art, and serve to demonstrate the versatility of the invention and its adaptability to specific applications. The manner in which the receiver operation may be adjusted in accordance with the foregoing changes will be discussed in connection with Fig. 11.

Figure 11:
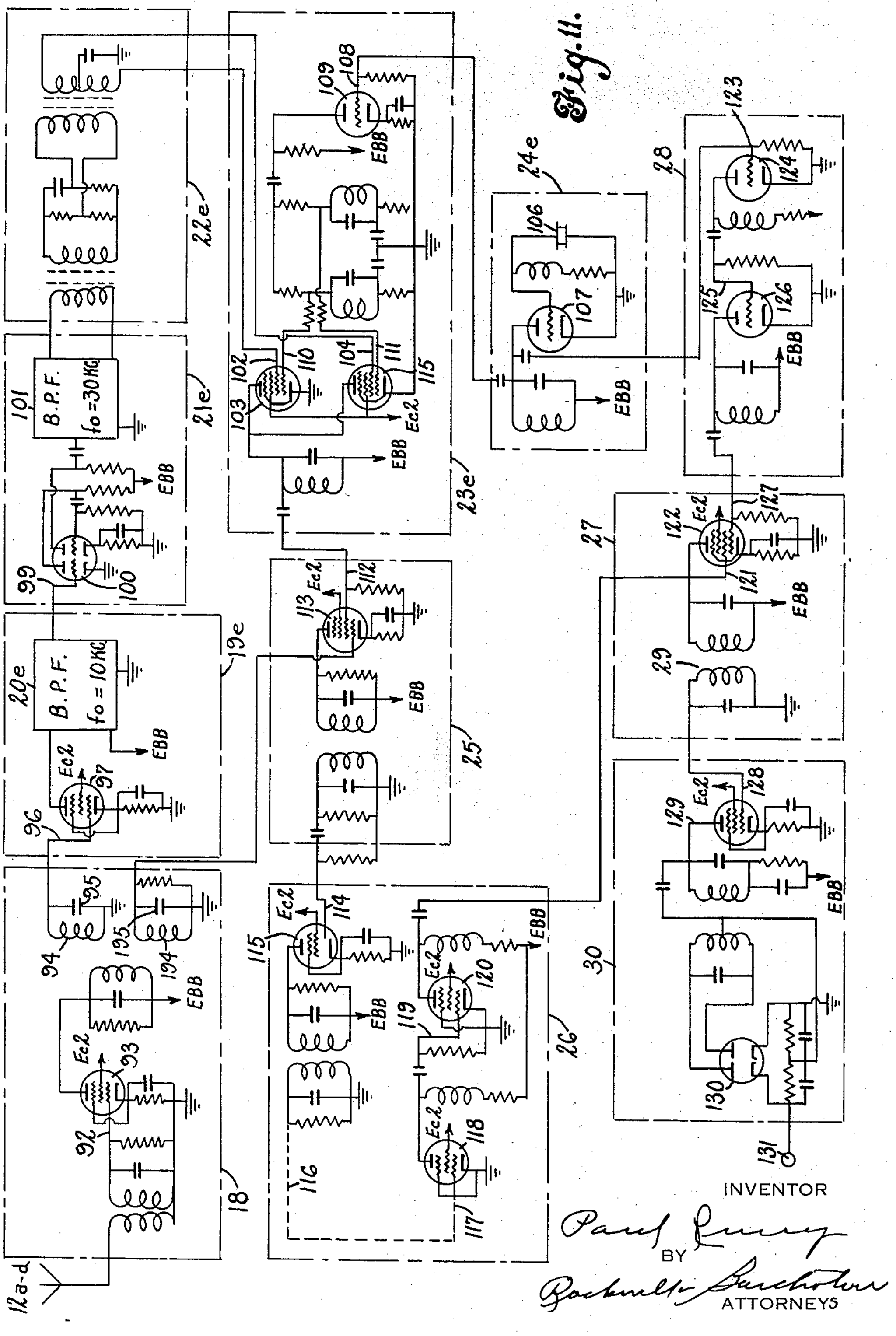
Fig. 11 is a schematic wiring diagram of a receiving apparatus of Fig. 2.

*Actual circuits.—Receiver* (*referring to Fig. 11*)

Waves A, B, C and D are received by antenna 12*a–d*, and amplified in amplifier 18, which consists of a tuned circuit (tuned to 11 mc. center frequency and R.-F. amplifier tube 93 having an input 92. The output of the amplifier is divided, by a twin-secondary transformer; a portion is taken through tuned circuit 94, 95 by means of lead 96 to detector 19*e*, which consists of tube 97. The output is passed through a bandpass filter adjusted to the modulating frequency of wave D (here, 10 kc.) as previously described to harmonic generator unit 21*e* through lead 99, having a tube 100, where the third harmonic is generated. This generator unit must be adjusted to generate the same harmonic as generator unit 13*a–c* of the transmitting system (Figs. 1 and 10). The output of the harmonic generator is passed through a bandpass filter 101 to unit 22*e*, which is a phasing network, to influence the phase of the output of unit 21*e*. A phasing network similar to unit 14*a–c*, described with reference to Fig. 10, is also suitable. The output of the phasing control unit 22*e* is fed to a phase modulator 23*e* by means of wires 102, 104 to influence the phasing of the R.-F. energy appearing therein, as will more fully appear below.

A R.-F. energy generator 24*e* having a crystal oscillator circuit 106, and tube 107, generates a local wave of 10.7 mc. as described before. The thus generated energy is conducted by means of lead 108 to phase modulator 23*e*, having an amplifier tube 109. The output of this tube is applied to inputs 110, 111, of tubes 103, 105, acting as reactance modulators, where the 10.7 mc. energy supplied by unit 24*e* is frequency modulated by 30 kc. energy, adjusted to be in phase with a selected one of waves A, B or C by phasing control 22e. The output of the phase modulator 23e, being local wave E, is taken by means of lead 112 to the first mixer 25, having a tube 113, to which also the second output of amplifier 18 is applied, which is obtained from secondaries 194, 195 of the output transformer of unit 18.

The output of unit 25 is fed through lead 114 to frequency multiplier 26, which is constructed as well known in the art, by providing a series of amplifier stages, having tuned output circuits which are tuned to harmonics of the input frequencies, three such stages being shown. The first stage comprises a tube 115, having an output circuit tuned, for example, to the third harmonic of the input; lead 116 conducting the output of the tuned circuit to the input of subsequent similar stages, in cascade. Frequency multiplied output is conducted through lead 117 to multiplier tube 118, the output of which is fed over lead 119 to amplifier tube 129 over an R.-F. choke circuit (which may be tuned) as is well known in the art. The output of frequency multiplier unit 26 is then fed by means of lead 121 to second mixer 27, where it is mixed with R.-F. energy derived from the local wave generator unit 24e, suitably frequency multiplied in unit 28. The harmonic generator unit 28 may be similar to frequency multiplier 26, or constructed as shown, including input lead 123, connected to tube 124, the output of which is taken by means of lead 125 to tube 126. The plate circuits of these tubes 124, 126 are tuned as shown (either in a series-tuned circuit, e. g. plate circuit of tube 124; or a parallel tuned circuit, e. g. tube 126) to effect the desired frequency multiplication. Lead 127 conducts the thus frequency multiplied R.-F. energy to a mixer tube 122, to which also the output of frequency multiplier 26 is applied. In tube 122 the two waves are heterodyned; the difference frequency is then filtered out by band pass filter 29 connected in the output circuit of the mixer 27, and applied by means of lead 128 to the FM signal detector unit 30 which comprises a discriminator network, as well known in the field, including an amplifier tube 129, twin diode 130, and the usual associated tuned circuits. The output of the discriminator is then obtained at terminal 131, to where an audio amplifier, and loudspeaker, may be connected.

Figure 2:
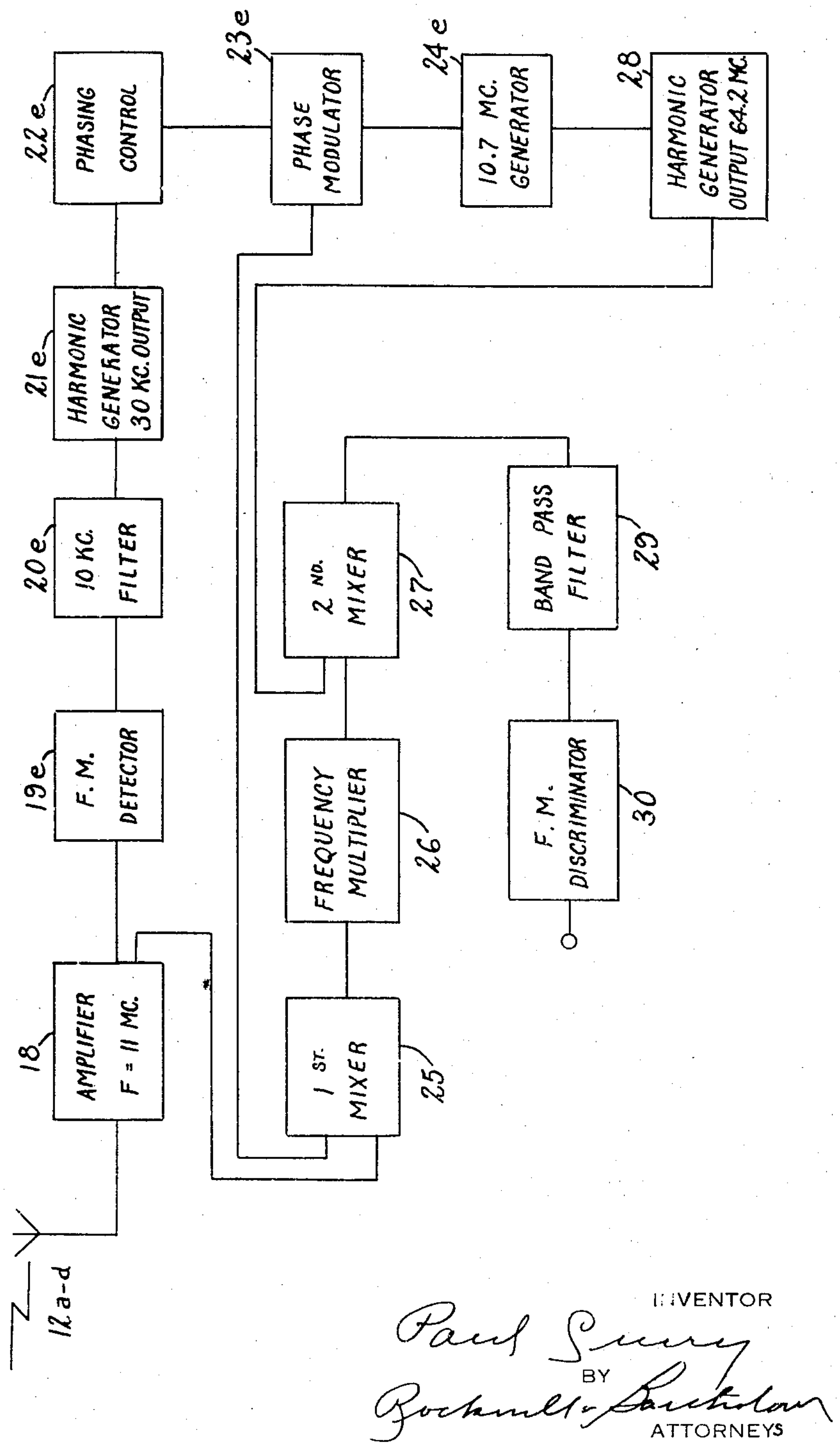
Fig. 2 is a block diagrammatic view of a wireless receiving apparatus suitable for receiving the signal transmitted by the apparatus of Fig. 1.

The individual circuit elements of the various units shown in the block diagrams of Figs. 1 and 2 have not been described in detail, since they all are component circuits well known in the radio field. For values of inductances, capacitances, resistances, and types of tubes, reference may be had to the aforementioned Radio Amateur's Handbooks.

It has been shown how any frequency relationship between the frequency modulation rate on the signal waves A, B and C and that on the control wave D may be utilized, other than that shown. For example, the waves A, B, C and D may have equal rates of frequency modulation and the wave D may have any predetermined phase relationship with any selected one of the signal waves A, B and C. Or the wave D may even have a higher rate of frequency modulation than the signal waves. The ease with which the structure, as shown in Figs. 1 and 10, may be adjusted to permit the operation of the transmitter with various relationships in the frequencies of the modulating waves, has already been illustrated.

Corresponding changes in the receiver structure of Fig. 11 may also be envisioned by anyone skilled in the art. For example, assuming that the waves A, B and C appearing on antenna 122d and applied to the input of tube 97 of unit 19e (Fig. 11), have a rate of frequency modulation of 10 kc. (instead of 30 kc.), and that the control wave D, likewise applied to the input of tube 97, has a rate of 30 kc. (instead of 10 kc.). By well-known techniques the band pass filter 20e of unit 19e may be adjusted to extract the third subharmonic (10 kc.) of the 30 kc. wave, and the band pass filter 101 of unit 21e adjusted to pass a 10 kc. wave (instead of 30 kc., as shown). Means for adjusting the phasing control 22e for operation with a 10 kc. wave (instead of 30 kc.) are also part of the literature.

While the invention has been illustrated and described as embodied in a method of transmitting energy, and system therefore, it is not intended to be limited to the details shown, since various modifications and circuit changes may be made. By applying current knowledge the invention, including the features that fairly constitute essential characteristics of the generic or specific aspects thereof, may be adapted to various applications, and such adaptations should and are intended to be comprehended within the meaning and range of equivalence of the following claims.

I claim:

1. A method of electrically conveying intelligence, comprising, generating a basic frequency wave; frequency multiplying part of said basic frequency wave to provide a modulating frequency wave; phase displacing portions of said modulating frequency wave to provide a plurality of modulating waves of equal frequency and different phase with respect to each other; frequency modulating at least two of said plurality of modulating waves by independent intelligence signals; generating a plurality of carrier waves under control of a single oscillator, one for each phase of the modulating waves and one for said basic frequency wave to provide carriers for said phase displaced modulating waves and for the unmultiplied basic frequency wave; frequency modulating each carrier wave with a phase displaced modulating wave, at least two of which are additionally modulated by intelligence signals, and frequency modulating a carrier wave with the basic frequency wave; transmitting said thus frequency modulated plurality of carrier waves to a receiving station whereby a plurality of signals are being transmitted with their respective frequency bandwidths superimposed on each other, the sum of their thus superimposed bandwidths being less than the sum of their individual bandwidths heterodyning said plurality of carrier waves with a local wave at the receiving station which is frequency modulated by a harmonic of the said unmultiplied basic frequency wave; synchronizing the said frequency modulated harmonic wave with a selected one of the plurality of carrier waves to produce a heterodyne wave component of the said selected wave modulated only by the intelligence signal, and detecting the said heterodyne wave whereby the intelligence signal impressed on the selected wave may be extracted and reproduced and the modulations impressed upon the unselected ones of the plurality of carrier waves are substantially reduced.

2. A system for electrically transmitting intelligence, comprising a plurality of sources of radio frequency energy of equal frequency and phase; a plurality of sources of modulating frequency energy of equal frequency and different phase; a frequency modulating unit for each source of modulating frequency connected to said source of modulating frequency energy and to a source of radio frequency energy to frequency modulate the radio frequency energy by the modulating frequency; transmitting means connected to said frequency modulating units to simultaneously transmit said radio frequency energy as modulated by the modulating frequencies of unequal phase; and receiving means including a heterodyning circuit and a phase control circuit connected to said heterodyning circuit to adjust the phasing of the heterodyning wave to be in phase with a selected phase of the modulating frequency energy; a source of control frequency energy; a frequency modulating unit connected to said source of control frequency energy and to one of the plurality of sources of radio frequency energy to frequency modulate the radio frequency energy; and selective means connected in the receiving means to separate the control frequency from the remainder of the energy appearing at the receiving means.

3. A system according to claim 2, including means for controlling the phasing of the phase control circuit in the receiving means by the control frequency.

4. A system according to claim 2, including means for adjusting the source of control frequency energy to supply energy at a lower frequency than the modulating frequency, and wherein the selective means includes band pass filter means to filter out the control frequency from the remainder of the energy appearing at the receiving means.

5. A system for electrically transmitting intelligence, comprising a plurality of sources of radio frequency energy of equal frequency and phase; a plurality of sources of modulating frequency energy of equal frequency and different phase; a frequency modulating unit for each source of modulating frequency connected to said source of modulating frequency energy and to a source of radio frequency energy to frequency modulate the radio frequency energy by the modulating frequency; transmitting means connected to said frequency modulating units to simultaneously transmit said radio frequency energy as modulated by the modulating frequencies of unequal phase; and receiving means including a heterodyning circuit and a phase control circuit connected to said heterodyning circuit to adjust the phasing of the heterodyning wave to be in phase with a selected phase of the modulating frequency energy; said frequency modulating unit including means for maintaining the modulation index of the frequency modulated radio frequency energy at a figure not substantially greater than 0.25.

6. A method of transmitting energy capable of conveying intelligence comprising generating a plurality of modulating frequency waves of the same frequency and displaced in phase with respect to each other by an identical fraction of 360 degrees; generating a carrier wave having a plurality of components of equal frequency and phase; frequency modulating said plurality of carrier wave components with said equally phase displaced waves whereby the sum of the sidecurrents of frequency modulation is substantially reduced; modulating at least two of the said plurality of modulating frequency waves by independent intelligence signals; simultaneously transmitting said thus modulated plurality of waves to a receiving station whereby a plurality of signals may be obtained with their respective frequency bandwidths superimposed on each other, the sum of their thus superimposed bandwidths being less than the sum of their individual bandwidths; additionally generating a basic frequency wave of predetermined frequency harmonically related to said phase displaced modulating frequency waves and a predetermined phase with respect to a selected one of said phase displaced waves; and extracting a selected one of said plurality of frequency modulated carrier wave components by heterodyning a local wave at a receiving station, which local wave has a constant frequency difference with the selected carrier wave component under control of said basic frequency wave.

References Cited in the file of this patent

UNITED STATES PATENTS

| | | |
|---|---|---|
| 1,652,092 | Clement | Dec. 6, 1927 |
| 1,896,235 | Hough | Feb. 7, 1933 |
| 2,055,309 | Ramsey | Sept. 22, 1936 |
| 2,283,575 | Roberts | May 19, 1942 |
| 2,380,982 | Mitchell | Aug. 7, 1945 |
| 2,478,920 | Hansell | Aug. 16, 1949 |
| 2,522,368 | Guanella | Sept. 12, 1950 |
| 2,534,106 | Cohen | Dec. 12, 1950 |
| 2,548,795 | Houghton | Apr. 10, 1951 |

UNITED STATES PATENT OFFICE

Certificate of Correction

Patent No. 2,852,606 September 16, 1958

Paul Curry

It is hereby certified that error appears in the printed specification of the above numbered patent requiring correction and that the said Letters Patent should read as corrected below.

Column 9, line 61, after "frequencies" insert *±10 kc. away from F are attenuated to .06 of their applied amplitudes, while frequencies*; column 10, line 7, for "$D_I$" read *D'*; column 14, line 47, after the word "frequency" insert a closing parenthesis.

Signed and sealed this 23rd day of December 1958.

[SEAL]

Attest:
KARL H. AXLINE,
*Attesting Officer.*

ROBERT C. WATSON,
*Commissioner of Patents.*